United States Patent [19]
Vassileff

[11] Patent Number: 4,612,333
[45] Date of Patent: Sep. 16, 1986

[54] FOAMED GYPSUM FILTER CONTAINING CARBONACEOUS MATERIAL

[76] Inventor: Neiko I. Vassileff, 1440 Midland Ave., Bronxville, N.Y. 10708

[21] Appl. No.: 715,118

[22] Filed: Mar. 22, 1985

[51] Int. Cl.⁴ ............................................. C08G 18/14
[52] U.S. Cl. ............................................. 521/83; 106/86; 106/87; 106/88; 106/109; 106/111; 131/331; 131/332; 131/334; 131/335; 131/340; 521/100
[58] Field of Search .................. 521/83, 100; 131/331, 131/332, 334, 335, 340; 106/86, 87, 88, 109, 111

[56] References Cited

U.S. PATENT DOCUMENTS

| | | | |
|---|---|---|---|
| 2,902,998 | 9/1959 | Durandeaux | 131/331 |
| 3,526,685 | 9/1970 | Foster et al. | 106/87 |
| 3,563,777 | 2/1971 | Pratt et al. | 106/88 |
| 3,719,513 | 3/1973 | Bragg et al. | 106/109 |
| 3,758,319 | 9/1973 | Ergene | 106/88 |
| 3,839,059 | 10/1974 | Rothfelder et al. | 106/109 |
| 3,926,650 | 12/1975 | Lange et al. | 106/88 |
| 3,974,024 | 8/1976 | Yano et al. | 106/88 |
| 4,084,980 | 4/1978 | Motoki | 106/87 |
| 4,133,638 | 1/1979 | Healey | 422/32 |
| 4,229,223 | 10/1980 | Flake | 106/88 |
| 4,240,839 | 12/1980 | Crepeau et al. | 106/88 |
| 4,265,964 | 5/1981 | Burkhart | 521/83 |

*Primary Examiner*—Maurice J. Welsh
*Attorney, Agent, or Firm*—Lackenbach, Siegel, Marzullo, Presta & Aronson

[57] ABSTRACT

A filter composition is formed from a foamed gypsum combined with fine particulate carbonaceous material such as activated carbon, dried blood and comminuted vegetable matter. The combination of activated carbon with dried blood provides a particularly effective human user filter system. A broad range of filter uses are contemplated such as face masks and cigarette filters.

33 Claims, No Drawings

FOAMED GYPSUM FILTER CONTAINING CARBONACEOUS MATERIAL

FIELD OF THE INVENTION

This invention relates to filters. More specifically, this invention relates to a foamed filter composition containing carbonaceous materials.

BACKGROUND AND DISCUSSION OF THE PRIOR ART

In the insulation field it was well known to provide gypsum and foamed gypsum for insulation purposes, such as is disclosed in the following U.S. patents:

| | |
|---|---|
| Crepeau et al. | 4,240,839 |
| Pratt et al. | 3,563,777 |
| Riddell et al. | 2,731,377 |
| Dixon et al. | 2,862,829 |
| Dickey et al. | 2,556,031 |
| Chappell | 2,593,008 |
| Mollo | 2,602,759 |
| Hoffman | 2,913,346 |
| Healey | 4,133,638 |
| Yano | 3,974,024 |
| Selden | 2,915,301 |
| Ergene | 3,758,319 |
| Lange et al. | 3,926,650 |
| Knowlton | 1,798,609 |
| Foster | 3,526,685 |
| Bragg et al. | 3,719,513 |
| Rothfelder et al. | 3,839,059 |
| Upson | 1,772,648 |
| Flake | 4,229,223 |
| Armstrong | 2,664,406 |
| Sucetti | 2,921,862 |
| Taylor | 2,979,415 |

In the filter field, to which the present invention pertains, generally a Hopcolite filter was employed for the removal of carbon monoxide. Hopcolite is a mixture of silver permanganate, copper oxide and nickel oxide. This prior art product was disadvantageous for several reasons, including the fact that it generated heat in use, was relatively expensive and contained substantial heavy metal compounds.

Now there is provided by the present invention a CO filter which is highly effective, non-toxic, non-flammable, light weight, non-settling, does not heat on use, and relatively low cost.

It is therefore a principal object of the present invention to provide a novel filter composition.

It is another object of the present invention to provide a filter composition useful in human user systems such as for example face mask filter and cigarette filter.

It is still a further object of the present invention to provide a filter system as aforesaid which in a broad sense simulates the filter activity of human lungs.

SUMMARY OF THE INVENTION

A filter composition combines a foamed gypsum with fine particulates of a carbonaceous material such as activated carbon, dried blood or comminuted vegetable matter, chelate and metal chelates. The combination of an activated carbon and the dried blood is found to be particularly effective in filter applications.

DESCRIPTION OF THE PREFERRED EMBODIMENTS

Broadly speaking, the present invention is a combination of a foamed gypsum with a carbonaceous material dispersed in the foamed gypsum structure. The said combination is proportioned such that to each 100 grams of gypsum there is from 20 to 500 grams of the carbonaceous material. In a more specific aspect the filter composition used to form the filter of the present invention is illustrated in the following TABLE I:

TABLE I

| Component | Weight (grams) |
|---|---|
| gypsum | 100 |
| carbonaceous material | 25–125 |
| foam softener or retarding agent | 1–10 |
| detergent | 2–7 |

In forming the foamed gypsum, the composition of Table I is admixed with about 60–70 grams of water to form a slurry. The slurry is then made into a froth or foam by combining with a foaming system or foam generating system. Particularly preferred are foaming systems which employ polymeric foams such as urea-formaldehyde, styrene and the like. These polymeric foaming systems are admixed as a liquid with the slurry. It has been found that the liquid polymeric foaming system may have a pH of approximately 7.0 to 12.0 prior to mixing with the slurry. The polymeric system then cures to a final foam product having a pH less than 7.0. The final pH is due to the prior addition of an acid, such as, for example aluminum sulfate. Other foaming systems are contemplated, including gaseous halocarbon, latex foam, and that foaming system disclosed in U.S. Pat. No. 4,240,839, granted Dec. 23, 1980 to Crepeau et al.

Suitable gypsums useful in the present invention are those well known in the insulation and plaster fields. Such gypsum is found as a natural rock deposit in most parts of the world. In the natural state, gypsum purity ranges from about 80 to 99 percent. Natural gypsum is basically calcium sulfate with two waters of hydration ($CaSO_4.2H_2O$). The heating of this gypsum to roughly 400° F. (i.e., so called calcining) will remove all but $\frac{1}{2}$ of the two waters of hydration providing a product designated as hemihydrate gypsum ($CaSO_4.\frac{1}{2}H_2O$) which is the form that is normally used for making all plaster products. This form is also available as a synthetic by-product of the fertilizer industry.

It is an important aspect of the present invention to provide carbonaceous material dispersed throughout the foamed gypsum. Preferred carbonaceous material include by way of example, activated carbon, dried blood, metal chelate and comminuted vegetable matter. The dried blood is particularly preferred, and more specifically the combination of dried blood and activated carbon. In the use of the comminuted vegetable matter, those materials containing chlorophyll are most preferred. As stated, a most preferred filter is one which combines activated carbon and dried blood. Other filter specific compounds and combinations are contemplated depending upon the desired end use of the filter. The filter specific compound is generally present in about equal dry weight to the gypsum.

The filter specific compound is preferably added as fine particulates or powder in the range of −50 to −300 mesh.

Another important aspect of the present invention is the presence of a foam softener or flexibility agent. The agent provides a softer, and perhaps more importantly, less frangible foamed gypsum than that found in the insulation field. A most preferred softening agent is sodium polyacrylate. A non-ionic detergent is also added to the composition to assist in forming the foam. A most preferred detergent is Rohm & Haas X-120 (Rohm & Haas, Philadelphia, PA), which is in a dry, granular form.

The following Examples are illustrative of the invention:

EXAMPLE 1

A slurry was mixed having the following composition:
gypsum (dry): 50 g.
activated carbon: 25 g.
blood[1]: 25 g.
sodium acrylate: 0.5 g.
non-ionic detergent[2]: 5.0 g.
water: 70 g.
1. spray dried
2. Rohm & Haas X-120

The slurry was foamed with air at room temperature for about 10 minutes.

A polymeric foaming system having the following compounds was mixed:
isocyanate: 50 g.
polyol: 50 g.
acid: 5 g.

The foaming system was added to the foamed slurry and allowed to cure to an expanded polyurethane foam. The final product was a dense, relatively soft polyurethane foamed gypsum having a black appearance.

A ½-inch thick sample was cut, and an inert gas containing 250 ppm. of CO was passed through the sample for a period of 20 minutes. The outlet gas contained only 14 ppm. CO, indicating a 94% efficiency.

EXAMPLES 2-28

The following general procedure was employed in these Examples 2-28.

Step 1.
One hundred (100) grams of gypsum is mixed with the filter specific compound and an acrylate with 125 gms. water until smooth.

Step 2.
One hundred and fifty (150) ml. of water are mixed with detergent (e.g., Rohm & Haas, Pa.) and an acid (e.g., $H_2SO_4$, $HNO_3$, aluminum sulfate) until a foam having the desired consistency is produced.

Step 3.
Mix the products of Steps 1 and 2 into a mold (e.g., bread pan) and place under a sun lamp. After 10-15 minutes transfer bread pan to oven at 192° to 200° F. to evaporate excess water.

The specific compositions for each of the Examples 2-28 are given below in Table II.

TABLE II

| FILTER NO. | TEST DURATION (MINUTES) | CO LEVEL IN (PPM) | CO LEVEL OUT (PPM) | % CO REDUCTION |
|---|---|---|---|---|
| Carbonaceous Material 64.6% Soluble Dried Blood | | | | |
| 2 | 15 | 550 | 240 | 58 |
| 3 | 15 | 550 | 185 | 66.5 |
| 4 | 15 | 550 | 80 | 85 |
| 5 | 15 | 550 | 109 | 80.5 |
| 6 | 15 | 550 | 45 | 92 |
| carbonaceous material: Gypsum (No Compound) | | | | |
| 7 | 15 | 527 | 420 | 20.9 |
| 8 | 15 | 527 | 527 | 0 |
| 9 | 15 | 527 | 340 | 35.5 |
| carbonaceous material: Hemoglobin and Gypsum | | | | |
| 10 | 120 | 527 | 230 | 56 |
| 11 | 20 | 527 | 350 | 33.6 |
| 12 | 15 | 527 | 380 | 28 |
| 13 | 15 | 527 | 340 | 35.5 |
| 14 | 15 | 527 | 340 | 35.5 |
| carbonaceous material: Dried blood and Gypsum | | | | |
| 15 | 15 | 527 | 360 | 32 |
| 16* | 15 | 527 | 330 | 37.4 |
| 17 | 15 | 527 | 330 | 75.4 |
| carbonaceous material: Hemoglobin, Activated Carbon and Gypsum | | | | |
| 18 | 15 | 527 | 420 | 75.4 |
| 19 | 15 | 527 | 310 | 40.2 |
| 20 | 80 | 527 | 340 | 35.5 |
| carbonaceous material: Gypsum and Polyurethane | | | | |
| 21 | 15 | 527 | 420 | 10.4 |
| 22 | 15 | 527 | 420 | 10.4 |
| carbonaceous material: Activated Carbon, Polyurethane and Gypsum | | | | |
| 23 | 15 | 527 | 380 | 28 |
| carbonaceous material: Iron chelate and Gypsum | | | | |
| 24 | 15 | 527 | 370 | 29.8 |
| 25 | 15 | 527 | 430 | 18.5 |
| 26 | 15 | 527 | 450 | 14.7 |
| 27 | 15 | 537 | 310 | 41.2 |
| 28 | 15 | 527 | 450 | 14.7 |

*Test was with water in filter.

All tests were conducted using a regular flow of about 7.8 mls. per sq. cm. per minute which was adjusted by hand periodically. In addition, material life tests were conducted with the following results:

| FILTER NO. | TIME | CO LEVEL IN | CO LEVEL OUT | % REDUCTION |
|---|---|---|---|---|
| 29 | 48 hrs. | 527 | 5.0 | 94 |

Further tests were made with an electronic flow meter with the following results:

| MLS. PER SQ. CM/MIN. | FILTER NO. | MINUTES | CO LEVEL IN (PPM) | CO LEVEL OUT (PPM) | % REDUCTION |
|---|---|---|---|---|---|
| 21.7 | 30 | 15 | 510 | 255 | 50 |
| 7.8 | 31 | 15 | 510 | 5.0 | 96 |

EXAMPLES 2-3

Step 1.
100 grams gypsum
25 grams activated carbon
50 grams 64.6% solution dry blood
1 gram polyacrylate Above dissolved in 125 grams water. Stir until smooth, no lumps.

Step 2.
150 cc. water
8 cc. Triton X-100

15 gr. acid

EXAMPLE 4
Step 1.
100 gr. gypsum
25 gr. activated carbon
50 gr. 64.6% soluble dry blood
1 gr. polyacrylate
25 gr. Elmer's glue
Step 2.
150 gr. water
8 cc. Triton X-100

EXAMPLE 5
Step 1.
100 gr. gypsum
25 gr. activated carbon
50 gr. 64.6% soluble dry blood
1 gr. polyacrylate
50 gr. Elmer's glue
Step 2.
150 gr. water
8 cc. Triton X-100
15 gr. acid

EXAMPLE 6
Step 1.
100 gr. gypsum
25 gr. activated carbon
50 gr. 64.6% soluble dry blood
1 gr. polyacrylate
25 gr. Elmer's rubber cement
Step 2.
150 gr. water
8 cc. Triton X-100
15 gr. acid

EXAMPLE 7
Step 1.
100 gr. gypsum
50 gr. isocyanide
1 gr. sodium acrylate
8 gr. Triton X-100
80 gr. $H_2O$
Step 2.
100 gr. $H_2O$
50 gr. polyol
8 gr. Triton X-100
20 gr. acid

EXAMPLE 8
Step 1.
100 gr. gypsum
1 gr. sodium polyacrylate
100 cc. $H_2O$

EXAMPLE 9
Step 1.
100 gr. gypsum
1 gr. sodium acrylate
70 cc. $H_2O$
Step 2.
80 cc. $H_2O$
8 gr. Triton X-100
35 gr. B Rabbit BS Molasses
20 gr. acid

EXAMPLE 10
Step 1.
100 gr. gypsum
95 gr. hemoglobin
1 gr. polyacrylate
150 $H_2O$
Step 2.
140 gr. $H_2O$
8 gr. Triton X-100
35 gr. Molasses
20 gr. acid

EXAMPLE 11
Step 1.
100 gr. gypsum
50 gr. hemoglobin
1 gr. polyacrylate
100 gr. $H_2O$
Step 2.
100 gr. $H_2O$
8 gr. Triton X-100
20 gr. acid

EXAMPLE 12
Step 1.
100 gr. gypsum
50 gr. hemoglobin
1 gr. polyacrylate
140 gr. $H_2O$
50 gr. isocyanide
Step 2.
100 gr. $H_2O$
8 gr. Triton X-100
25 gr. acid
50 gr. polyol

EXAMPLE 13
Step 1.
100 gr. gypsum
100 gr. hemoglobin
1 gr. sodium acrylate
150 gr. $H_2O$
Step 2.
140 gr. $H_2O$
8 gr. Triton X-100
35 Molasses
20 gr. acid

EXAMPLE 14
Step 1.
100 gr. gypsum
125 gr. hemoglobin
1 gr. sodium acrylate
200 gr. $H_2O$
Step 2.
150 gr. $H_2O$
8 gr. Triton X-100
30 gr. Molasses
25 gr. acid

EXAMPLE 15-16
Step 1.
100 gr. gypsum
125 gr. dried blood
1 gr. sodium acrylate
200 gr. $H_2O$
Step 2.

150 gr. H$_2$O
8 gr. Triton X-100
30 gr. Molasses
25 gr. acid

EXAMPLE 17

Step 1.
100 gr. gypsum
125 gr. dried blood
1 gr. sodium acrylate
250 gr. H$_2$O
30 gr. activated carbon
Step 2.
150 gr. H$_2$O
8 gr. Triton X-100
30 gr. Molasses
25 gr. acid

EXAMPLE 18

Step 1.
100 gr. gypsum
50 gr. hemoglobin
*35 gr. Flambinder NX
25 gr. activated carbon
120 gr. H$_2$O
Step 2.
140 gr. H$_2$O
8 gr. Triton X-100
10 gr. acid

EXAMPLE 19

Step 1.
100 gr. gypsum
50 gr. hemoglobin
*35 gr. Flambinder NX
25 gr. activated carbon
120 gr. H$_2$O
Step 2.
140 gr. H$_2$O
8 gr. Triton X-100
20 gr. acid

EXAMPLE 20

Step 1.
100 gr. gypsum
50 gr. hemoglobin
1 gr. polyacrylate
100 gr. H$_2$O
50 gr. isocyanide
*25 gr. Flambinder
Step 2.
100 gr. H$_2$O
8 gr. Triton X-100
25 gr. acid
50 gr. polyol
*Flambeau Paper Corporation Park Falls, Wis. (U.S.A.)

EXAMPLE 21

Step 1.
100 gr. gypsum
50 gr. isocyanide
80 gr. H$_2$O
1 gr. sodium acrylate
Step 2.
100 gr. H$_2$O
50 gr. polyol
8 gr. Triton X-100
10 gr. acid

EXAMPLE 22

Step 1.
100 gr. gypsum
50 gr. polyol
1 gr. sodium acrylate
20 gr. H$_2$O
Step 2.
100 gr. H$_2$O
50 gr. isocyanide
8 gr. Triton X-100
10 gr. acid

EXAMPLE 23

Step 1.
100 gr. gypsum
25 gr. activated carbon
50 gr. isocyanide
1 gr. sodium acrylate
100 gr. H$_2$O
Step 2.
100 gr. H$_2$O
50 gr. polyol
10 gr. acid
8 gr. Triton X-100

EXAMPLE 24

Step 1.
100 gr. gypsum
50 gr. isocyanide
1 gr. sodium acrylate
50 gr. H$_2$O
8 gr. Triton X-100
Step 2.
50 gr. iron chelate
100 gr. H$_2$O
50 gr. polyol
10 gr. acid
8 gr. Triton X-100

EXAMPLE 25

Step 1.
100 gr. gypsum
50 gr. isocyanide
1 gr. sodium acrylate
50 gr. H$_2$O
8 gr. Triton X-100
25 gr. activated carbon
Step 2.
50 gr. Iron chelate
100 gr. H$_2$O
50 gr. polyol
10 gr. acid
8 gr. Triton X-100

EXAMPLE 26

Step 1.
100 gr. H$_2$O
100 gr. gypsum
50 gr. isocyanide
1 gr. sodium acrylate
8 gr. Triton X-100
25 gr. activated carbon
Step 2.
100 gr. H$_2$O
50 gr. polyol
50 gr. iron chelate
20 gr. acid 8 gr. Triton X-100

EXAMPLE 27

Step 1.
100 gr. gypsum
50 gr. isocyanide
50 gr. iron chelate
1 gr. sodium acrylate
100 gr. $H_2O$
8 gr. Triton X-100
25 gr. activated carbon
Step 2.
100 gr. $H_2O$
50 gr. polyol
20 gr. acid
8 gr. Triton X-100

EXAMPLE 28

Step 1.
100 gr. gypsum
50 gr. isocyanide
1 gr. sodium acrylate
8 gr. Triton X-100
60 gr. $H_2O$
Step 2.
100 gr. $H_2O$
50 gr. polyol
20 gr. acid
8 gr. Triton X-100
50 gr. iron chelate In yet a further example of the invention, the following composition of the filter was made with chlorophyll in lieu of dried blood and activated carbon.
Step 1.
100 gr. gypsum
25 gr. chlorophyll
1 gr. sodium acrylate
120 gr. $H_2O$
Step 2.
100 gr. $H_2O$
10 gr. Triton X-100
15 gr. Al-sulfate
Step 3.
75 gr. polyol
75 gr. isocyanide In this further example noted hereinabove, the test results obtained were as follows:

Filter of further example

|  | Flow | Time | $SO_2$ Level In | $SO_2$ Level Out | % Reduction |
|---|---|---|---|---|---|
| Example 4 filter | 7.8 | 15 min. | 515 | 412 | 18% |
|  | 7.8 | 15 min. | 515 | 72 | 86% |

|  | | | $NO_x$ Level In | $NO_x$ Level Out | % Reduction |
|---|---|---|---|---|---|
| Example 4 filter | 7.8 | 15 min. | 520 | 100 | 77% |

The $SO_2$ and $NO_x$ gases were obtained from commercial sources wherein the $SO_2$ was contained in a pressurized air tank having 515 ppm; and the $NO_x$ was likewise provided in a pressurized air tank and exhibited 520 ppm which consisted of 80% NO and 20% $NO_2$. The filter samples of Examples 2-28 were tested by passing an essentially inert gas containing measured parts per million of CO from a compressed gas tank, through each sample. All tests were conducted at a gas flow of 7.8 ml/sq.cm. The level of CO at the downstream side of the filter was measured, and the percent CO reduction calculated. The test results are shown above in Table II.

It has been demonstrated that the combination of a carbonaceous material in a foamed gypsum reduces the CO. The combination of dried blood and activated carbon in a foamed gypsum is a particularly effective filter, in removing 58 to 96% of the CO over a 15 minute period.

The filter composition of the present invention may be used as air or smoke filters (e.g., smoke masks, cigarette filters, air conditioner filters, air purifiers, furnace filters, and the like); oil filters (e.g., automobiles, trucks, stationary engines), and water/aqueous liquid filters (e.g., general filtration, sewerage treatment, swimming pools, beer and wine production, and general solvent filtration). The filter product of the present invention is useful in many applications, including by way of examples, filter aids, filter bags, filter cloth, filter elements, filter materials, filter systems, air filters, filter activated carbon, air compressorfilters, enginefilters, automotive filters, mechanical filters, cartridges, chemical filters, coalescing filters, compressor filters, coolant, electronic, food product, gas, hydraulic, industrial, instrument, microwave, military, pressure, gravity, refrigeration, taste and odor removal and other filter equipment.

It is important to note that gypsum, unlike asbestos filter material, is non-toxic and non-carcinogenic and therefore is highly useful in human breathing filter applications. In addition, gypsum does not burn under the heat present in fires and normal burning situations and therefore the human breathing filter applications are complemented in this regard. Particularly preferred human use applications are cigarette and smoke mask filters. Where human breathing applications are contemplated, the foaming system employed should also be one which will withstand the high temperatures contemplated.

Without wishing to be bound by any theory or mechanism, it is believed that the activated carbon/dried blood foamed gypsum filter, as well as the foamed gypsum/chlorophyl filter (without dried blood or activated carbon) in a broad sense, simulates the gas and particulate filter aspects of the human lung. Thus, for example, a cigarette filter embodying the invention will remove those noxious gases and particulates normally entrained by the lung tissues.

Also, it will be appreciated that the filters of the present invention form a solid, dry, hard porous material which can be used to remove not only CO, but also $SO_2$ and $NO_x$ and other like gaseous contaminating or noxious compounds.

In yet further testing of filters made in accordance with the present invention, the following test data was obtained on runs made on the filters:

| Filter No. | Test (Hours) | CO Level In (PPM) | CO Level Out (PPM) | % Reduction |
|---|---|---|---|---|
| 32 | 1.0 | 527 | 115 | 78 |
| 33 | 1.75 | 527 | 103 | 80.5 |
| 34 | 4.0 | 527 | 90 | 82.9 |
| 35 | 5.0 | 527 | 110 | 79.1 |
| 36 | 5.5 | 527 | 160 | 69.5 |

Although the invention has been described with respect to certain specific embodiments, it will be appreciated that modifications and changes may be made by those skilled in the art within the true spirit and scope of the invention.

We claim:

1. A foamed gypsum filter for filtering oxygenated gases comprising carbonaceous material.

2. The filter of claim 1, wherein the oxygenated gases are selected from the group consisting of carbon monoxide, sulfur dioxide, and nitrogen oxides.

3. The filter of claim 1, wherein the carbonaceous material is selected from the group consisting of activated carbon, dried blood, comminuted vegetable matter, chelate and metal chelates.

4. The filter of claim 3, wherein the vegetable matter comprises chlorophyll.

5. The filter of claim 3, wherein the dried blood comprises hemoglobin.

6. The filter of claim 3, wherein the carbonaceous material comprises activated carbon and dried blood.

7. The filter of claim 1, wherein the foamed gypsum and the carbonaceous material are present at about equal weight on a dry basis.

8. The filter of claim 1, wherein the carbonaceous material is present from about one-fifth to about five times the weight of the foamed gypsum.

9. The filter of claim 2, wherein the filter removes from about 58 to about 96% of carbon monoxide flowing through it in a 15-minute period.

10. The filter of claim 2, wherein the filter removes about 18 to about 86% of sulfur dioxide flowing through it in a 15-minute period.

11. The filter of claim 2, wherein the filter removes about 77% of nitrogen oxide flowing through it in a 15-minute period.

12. The filter of claim 3 in the form of a face mask.

13. The filter of claim 3 in the form of a cigarette filter.

14. A filter composition for filtering oxygenated gases selected form the group consisting of carbon monoxide, sulfur dioxide, and nitrogen oxide comprising foamed gypsum, carbonaceous material, and a flexibilizing agent.

15. The filter composition of claim 14, wherein the carbonaceous material is in the form of fine particles selected from the group consisting of activated carbon, dried blood, comminuted vegetable matter, chelate, and metal chelates.

16. The filter composition of claim 14, wherein the flexibilizing agent is sodium polyacrylate.

17. The filter composition of claim 14 further comprising a detergent.

18. The filter composition of claim 14 further comprising a polymeric foam selected from the group consisting of polyurethane, urea-formaldehyde resin, and polystyrene.

19. The filter composition of claim 15, wherein said fine particles are from about −50 mesh to about −300 mesh.

20. The filter composition of claim 15, wherein said carbonaceous material comprises activated carbon and dried blood.

21. The filter composition of claim 15, wherein said carbonaceous material comprises activated carbon and chlorophyll.

22. The filter composition of claim 20 in the form of a face mask filter.

23. A method for making a filter composition for filtering oxygenated gases selected from the group consisting of carbon monoxide, sulfur dioxide, and nitrogen oxide, said composition comprising foamed gypsum, a flexibilizing agent, and a carbonaceous material selected from the group consisting of activated carbon, dried blood, comminuted vegetable matter, chelate and metal chelates comprising:

mixing gypsum, water, and fine particles of the carbonaceous material to form a slurry; and combining the slurry with a foaming agent.

24. The method of claim 23, wherein the slurry has a a pH from about 7 to about 12.

25. The method of claim 23, wherein the slurry further comprises a detergent.

26. The method of claim 23, wherein the slurry further comprises a foam softening agent.

27. The method of claim 23, wherein the gypsum and carbonaceous material are present in about equal amounts by weight.

28. The method of claim 23, wherein the foaming agent is selected from the group consisting of urethane, urea-formaldehyde resin, styrene, gaseous halocarbon, and polymeric latex.

29. The method of claim 26, wherein said foam softening agent is present in an amount of from about 5 to about 10% by weight of the dry gypsum.

30. The method of claim 23, wherein said fine particles are from about −50 mesh to about −300 mesh.

31. The method of claim 23, wherein said carbonaceous material comprises activated carbon and dried blood.

32. The method of claim 31, wherein the filter removes about 58 to about 96% of carbon monoxide gas initially present at 550 ppm.

33. The method of claim 23, wherein said carbonaceous material comprises activated carbon and chlorophyll.

* * * * *